(12) United States Patent
Ryf

(10) Patent No.: US 9,083,472 B2
(45) Date of Patent: Jul. 14, 2015

(54) OPTICAL FEED-FORWARD EQUALIZER FOR MIMO SIGNAL PROCESSING

(71) Applicant: Roland Ryf, Aberdeen, NJ (US)

(72) Inventor: Roland Ryf, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 126 days.

(21) Appl. No.: 13/786,638

(22) Filed: Mar. 6, 2013

(65) Prior Publication Data

US 2013/0236195 A1 Sep. 12, 2013

Related U.S. Application Data

(60) Provisional application No. 61/608,246, filed on Mar. 8, 2012.

(51) Int. Cl.
| | |
|---|---|
| H04B 10/06 | (2006.01) |
| H04B 10/69 | (2013.01) |
| H04B 10/61 | (2013.01) |
| G02B 6/293 | (2006.01) |

(52) U.S. Cl.
CPC ........ *H04B 10/6971* (2013.01); *G02B 6/29358* (2013.01); *G02B 6/29395* (2013.01); *H04B 10/615* (2013.01)

(58) Field of Classification Search
CPC ......... H04B 10/06; H04B 10/60; H04J 14/06; H04J 14/02
USPC ....................................................... 398/208
See application file for complete search history.

(56) References Cited

U.S. PATENT DOCUMENTS

| | | | | |
|---|---|---|---|---|
| 7,062,174 | B2 * | 6/2006 | Turpin et al. | 398/83 |
| 7,509,048 | B2 * | 3/2009 | Turpin et al. | 398/83 |
| 2003/0002783 | A1 * | 1/2003 | Neilson et al. | 385/18 |
| 2003/0128917 | A1 * | 7/2003 | Turpin et al. | 385/24 |
| 2004/0258183 | A1 * | 12/2004 | Popescu et al. | 375/350 |
| 2005/0019042 | A1 * | 1/2005 | Kaneda et al. | 398/208 |
| 2007/0258517 | A1 * | 11/2007 | Rollings et al. | 375/233 |
| 2010/0074632 | A1 * | 3/2010 | Zhou | 398/208 |
| 2010/0196009 | A1 * | 8/2010 | Qian et al. | 398/65 |
| 2010/0329670 | A1 | 12/2010 | Essiambre et al. | |
| 2010/0329671 | A1 * | 12/2010 | Essiambre et al. | 398/44 |

(Continued)

OTHER PUBLICATIONS

C. P. Tserekos, A. M. J. Koonen, Mode-selective spatial filtering for increased robustness in a mode group diversiy multiplexing link, May 1, 2007, Optics Letters, vol. 32, No. 9, pp. 1041-1043.*

(Continued)

*Primary Examiner* — David Payne
*Assistant Examiner* — Pranesh Barua
(74) *Attorney, Agent, or Firm* — Mendelsohn, Drucker & Dunleavy, P.C.; Yun Gruzdkov

(57) ABSTRACT

A feed-forward equalizer can be used in the host optical receiver to perform at least some of the desired signal processing in the optical domain, e.g., prior to coherently detecting and digitizing the received optical signal(s). In some embodiments, the signal processing implemented in the feed-forward equalizer can at least partially compensate the adverse effects of chromatic dispersion, polarization-mode dispersion, and/or spatial-mode mixing/crosstalk imparted on the received optical signal(s) in the optical transport link. This reduces the signal-processing load of and the signal-processing requirements to the receiver's electrical DSP.

18 Claims, 6 Drawing Sheets

(56) References Cited

U.S. PATENT DOCUMENTS

| | | | |
|---|---|---|---|
| 2011/0052216 A1* | 3/2011 | Jiang et al. | 398/208 |
| 2011/0243490 A1 | 10/2011 | Ryf | |
| 2012/0045222 A1* | 2/2012 | Filer et al. | 398/194 |
| 2012/0114016 A1* | 5/2012 | Wehinger | 375/146 |
| 2012/0177384 A1* | 7/2012 | Ryf | 398/202 |
| 2013/0128133 A1* | 5/2013 | Chen et al. | 349/9 |
| 2013/0188965 A1* | 7/2013 | Afriat et al. | 398/136 |
| 2014/0023133 A1* | 1/2014 | Foggi et al. | 375/232 |

OTHER PUBLICATIONS

International Search Report and Written Opinion; Mailed Jul. 10, 2013 for the corresponding PCT Application No. PCT/US2013/029477.

Ryf, R., et al., "Mode-Division Multiplexing Over 96 km of Few-Mode Fiber Using Coherent 6x6 MIMO Processing," Journal of Lightwave Technology, vol. 30, No. 4, Feb. 15, 2012; pp. 521-531.

Koc, U., et al., "Integrated Optical Equalizer Using Opto-Electronic Least Mean Square Algorithm for Chromatic and Polarization Mode Dispersion Compensation," Lasers and Electro-Optics Society, 2004. The 17th Annual Meeting of the IEEE, Nov. 7-11, 2004, vol. 2, pp. 751-752.

U.S. Appl. No. 13/200,072, entitled, "Optical Mode Couplers for Multi-Mode Optical Fibers Background," filed Sep. 16, 2011.

Winters, Jack H., "Equalization in Coherent Lightwave Systems Using a Fractionally Spaced Equalizer," Journal of Lightwave Technology, Oct. 1990, vol. 8, No. 10, pp. 1487-1491.

Berry, M. H. and Gookin, D. M., "Wide-band RF Signal Processing with Optoelectronic Devices and Fiber-Optic Delay Lines," Naval Ocean Systems Center, San Diego, California 92152-5000, Report No. NOSC TR 1385, Technical Report 1385, Dec. 1990 (25 pages).

\* cited by examiner

OPTICAL FEED-FORWARD EQUALIZER FOR MIMO SIGNAL PROCESSING

CROSS-REFERENCE TO RELATED APPLICATIONS

This application claims priority from U.S. Provisional Patent Application No. 61/608,246, filed on Mar. 8, 2012, and entitled "OPTICAL FEED-FORWARD EQUALIZER, SUCH AS FOR AN OPTICAL RECEIVER." This provisional patent application is incorporated herein by reference in its entirety.

BACKGROUND

1. Field of the Invention

The present invention relates to optical communication equipment and, more specifically but not exclusively, to an optical feed-forward equalizer that can be used in MIMO (multiple input, multiple output) signal processing.

2. Description of the Related Art

This section introduces aspects that may help facilitate a better understanding of the invention(s). Accordingly, the statements of this section are to be read in this light and are not to be understood as admissions about what is in the prior art or what is not in the prior art.

The next-generation of optical communication systems is being designed for relatively high data-transmission rates, e.g., higher than about 100 Gbit/s per channel. At these rates, the effects of chromatic dispersion (CD) and polarization-mode dispersion (PMD) may significantly degrade the transmission performance of optical transport links. A representative prior-art approach to dealing with these signal impairments is to perform appropriate signal processing in the electrical digital domain, e.g., after the corresponding optical signal has been coherently detected and digitized at the receiver. This electrical digital signal processing is typically implemented using a customized ASIC, which can be relatively expensive to design and/or fabricate. In addition, such an ASIC typically requires relatively high power to operate, with the consumed power being approximately proportional to the operative baud rate squared.

The optical MIMO methods that exploit the inherently high transmission capacity of multipath (e.g., multimode and/or multi-core) optical fibers tend to further increase the complexity of digital signal processing at the receiver, e.g., because the corresponding ASIC may be additionally configured to deal with the effects of spatial-mode mixing and crosstalk in the corresponding multipath optical transport link. By some estimates, the complexity of an ASIC configured to process MIMO signals might be about one hundred times higher than that of an ASIC that does not implement MIMO processing. As a result, practical implementation and operation of an electrical digital signal processor (DSP) configured to handle the effects of CD, PMD, and spatial-mode mixing/crosstalk in an optical MIMO system might be too expensive for commercial applications.

SUMMARY OF SOME SPECIFIC EMBODIMENTS

At least some of the above-indicated problems are addressed by various embodiments of an optical feed-forward equalizer disclosed herein. In one embodiment, the optical feed-forward equalizer is part of the host optical receiver that enables the latter to perform at least some of the desired signal processing in the optical domain, e.g., prior to coherently detecting and digitizing the received optical signal(s). The optical signal processing implemented in the optical feed-forward equalizer can be used, e.g., to at least partially compensate the adverse effects of chromatic dispersion, polarization-mode dispersion, and/or spatial-mode mixing/crosstalk imposed on the received optical signal(s) by the optical transport link. This reduces the signal-processing load of and/or the signal-processing requirements to the receiver's electrical DSP.

According to one embodiment, provided is an apparatus comprising an optical feed-forward equalizer configured to be coupled between an input fiber and one or more output fibers. The feed-forward equalizer comprises: an optical splitter configured to optically split light received from the input fiber into a plurality of sub-beams; and a first spatial light modulator (SLM), wherein the optical splitter is configured to pass at least some sub-beams of said plurality of sub-beams to the first SLM such that a sub-beam from the at least some sub-beams impinges on a portion of the first SLM. The first SLM is configured to (i) receive said at least some sub-beams from the optical splitter with relative time delays with respect to one another and (ii) spatially modulate each of the received sub-beams to generate a respective modulated beam. The feed-forward equalizer is configured to couple the modulated beams generated by the first SLM into an optical fiber of the one or more output fibers.

In some embodiments of the above apparatus, the first SLM is configured to receive said at least some sub-beams from the optical splitter with the relative time delays that have values from a set consisting of integer multiples of a constant time delay.

In some embodiments of any of the above apparatus, the feed-forward equalizer is configured to operate as an optical finite-impulse-response filter.

In some embodiments of any of the above apparatus, the input fiber is a multimode fiber.

In some embodiments of any of the above apparatus, the feed-forward equalizer further comprises an optical spatial-mode de-multiplexer coupled to the input fiber and configured to spatially separate light that populates different spatial modes of the input fiber; and the optical splitter is configured to optically split the spatially separated light to generate the plurality of sub-beams.

In some embodiments of any of the above apparatus, the optical splitter is configured to cause said at least some sub-beams of the plurality of sub-beams to impinge onto the first SLM as a rectangular array in which the sub-beams are parallel to one another.

In some embodiments of any of the above apparatus, the first SLM is configured to operate in transmission.

In some embodiments of any of the above apparatus, the first SLM comprises an array of MEMS mirrors.

In some embodiments of any of the above apparatus, the optical splitter comprises an optically transparent plate having first and second opposing surfaces, wherein: the first surface has a first portion covered by an anti-reflection coating and a second portion covered by a non-transparent mirror; and the second surface has a first portion covered by a partially transparent mirror.

In some embodiments of any of the above apparatus, the first portion of the first surface is configured to receive light from the input fiber and couple the received light into an interior of the optically transparent plate; and the optical splitter is configured to generate at least a subset of the plurality of sub-beams using light that exits the interior of the optically transparent plate through the partially transparent mirror.

In some embodiments of any of the above apparatus, the apparatus is configured such that the relative time delay of a sub-beam in said subset is determined by a respective number of back-and-forth trips in a zigzag pattern that the light of the sub-beam takes in the interior of the optically transparent plate between the first surface and the second surface before leaving the interior through the partially transparent mirror.

In some embodiments of any of the above apparatus, the optically transparent plate is oriented at a tilt angle with respect to an input plane of the first SLM.

In some embodiments of any of the above apparatus, the feed-forward equalizer is configured to have the input fiber oriented at a tilt angle with respect to the optically transparent plate.

In some embodiments of any of the above apparatus, the second surface has a second portion covered by an anti-reflection coating; and the optical splitter is configured to generate at least one of the sub-beams using light that exits the interior of the optically transparent plate through the second portion of the second surface.

In some embodiments of any of the above apparatus, the partially transparent mirror has non-uniform reflectivity across the first portion of the second surface.

In some embodiments of any of the above apparatus, the feed-forward equalizer further comprises one or more additional SLMs, wherein: the optical splitter is further configured to apply a respective subset of said plurality of sub-beams to each of the one or more additional SLMs such that different sub-beams of the respective subset impinge on different respective portions of the corresponding additional SLM; each of the one or more additional SLMs is configured to (i) receive the respective subset of said plurality of sub-beams from the optical splitter with relative time delays with respect to one another and (ii) spatially modulate each of the received sub-beams to generate a respective modulated beam; and the feed-forward equalizer is further configured to couple the modulated beams generated by each of the one or more additional SLMs into a respective one of the output fibers different from the optical fiber configured to receive the modulated beams generated by the first SLM.

In some embodiments of any of the above apparatus, the apparatus further comprises a controller coupled to the first SLM and the one or more additional SLMs to control respective spatial modulation patterns imparted by the SLMs onto the respective received sub-beams.

In some embodiments of any of the above apparatus, the controller is configured to cause the SLMs to display the respective spatial modulation patterns in a manner that causes the feed-forward equalizer to reverse spatial-mode mixing imparted, by a corresponding optical transport link, on the light received from the input fiber.

In some embodiments of any of the above apparatus, the apparatus further comprises a controller coupled to the first SLM to control spatial modulation patterns imparted by the first SLM onto the received sub-beams, wherein the controller is configured to cause the first SLM to display the spatial modulation patterns in a manner that causes the feed-forward equalizer to mitigate effects of dispersion imparted, by an optical transport link, on the light received from the input fiber.

In some embodiments of any of the above apparatus, the feed-forward equalizer is part of an optical receiver; and the optical receiver comprises a coherent optical detector configured to receive light from the feed-forward equalizer through the optical fiber configured to receive the modulated beams generated by the first SLM.

According to another embodiment, provided is a method of processing optical signals, wherein the method has the steps of: (A) splitting, in an optical splitter, light received from an input fiber into a plurality of sub-beams; (B) applying at least some sub-beams of said plurality to a first SLM so that (i) different sub-beams impinge on different respective portions of the first SLM and (ii) the sub-beams applied to the first SLM have relative time delays with respect to one another; (C) spatially modulating, in the first SLM, each of the sub-beams applied to it by the optical splitter to generate a respective modulated beam; and (D) optically coupling the modulated beams generated by the first SLM into a first of one or more output fibers.

BRIEF DESCRIPTION OF THE DRAWINGS

Other aspects, features, and benefits of various embodiments of the disclosure will become more fully apparent, by way of example, from the following detailed description and the accompanying drawings, in which.

DETAILED DESCRIPTION

Figure 1:
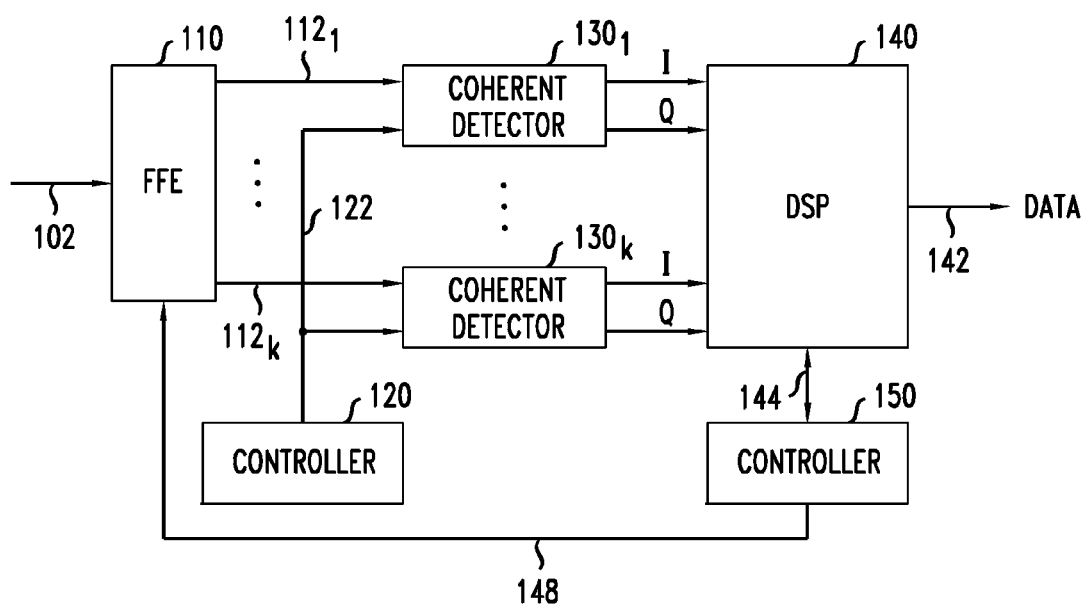
FIG. 1 shows a block diagram of an optical receiver according to an embodiment of the disclosure.

FIG. 1 shows a block diagram of an optical receiver 100 according to an embodiment of the disclosure. Receiver 100 is configured to receive an optical input signal 102 via a corresponding optical transport link (not explicitly shown in FIG. 1) from a remote optical transmitter. The optical transport link may be implemented using a single-mode fiber, a multimode fiber, a multi-core fiber, and/or a fiber-optic cable having a plurality of optical fibers. Representative examples of optical fibers that can be used to deliver signal 102 to receiver 100 are disclosed, e.g., in U.S. Patent Application Publication Nos. 2010/0329670 and 2010/0329671, both of which are incorporated herein by reference in their entirety. In some embodiments, optical input signal 102 can be a space-division multiplexed (SDM) signal generated as described, e.g., in U.S. patent application Ser. No. 12/986,468 (filed on Jan. 7, 2011) and U.S. Patent Application Publication No. 2011/0243490, both of which are incorporated herein by reference in their entirety.

Optical input signal 102 is applied to a feed-forward equalizer (FFE) circuit 110 configured to perform optical signal processing, e.g., as further described below in reference to FIGS. 2-5. In various embodiments, the optical signal processing implemented in FFE circuit 110 is directed at reducing the adverse effects of certain signal impairments imposed on optical input signal 102 in the optical transport link. Representative examples of such impairments include, but are not limited to CD, PMD, spatial-mode mixing, and other linear signal distortions. A control signal 148 generated by a controller 150 may be used to dynamically change the configuration of FFE circuit 110, e.g., to track the changing conditions in the optical transport link. Control signal 148 can be generated, e.g., based on the results of signal decoding in an electrical digital signal processor (DSP) 140 that are provided to controller 150 via a DSP/controller interface 144.

Based on the optical signal processing implemented therein, FFE circuit 110 generates K optical signals $112_1$-$112_K$, where K is a positive integer. Although the embodiment shown in FIG. 1 corresponds to K>1, an embodiment for which K=1 is also possible (for example, see FIG. 2A).

Each of optical signals $112_1$-$112_K$ generated by FFE circuit 110 is coherently detected, as known in the art, by a corresponding coherent detector 130 using a local oscillator (LO) signal 122 supplied by an LO source 120. The detection results generated by coherent detector 130 are digitized and supplied in electrical digital form to DSP 140. In a representative embodiment, each electrical digital sample provided by coherent detector 130 to DSP 140 includes digital measures of the in-phase and quadrature components of signal 112, e.g., as indicated in FIG. 1 by digital signals labeled I and Q, respectively. For each signaling interval (e.g., symbol period), DSP 140 processes a full set of digital measures I and Q generated by coherent detectors $130_1$-$130_K$ to generate an output data stream 142. Provided that receiver 100 appropriately handles optical input signal 102, output data stream 142 contains all the data that have been transmitted by the remote transmitter.

One skilled in the art will understand that one function of FFE circuit 110 and DSP 140 is to implement signal processing that inverts the transfer function corresponding to the optical transport link between the remote transmitter and receiver 100. For polarization-division multiplexed (PDM) and/or space-division multiplexed (SDM) signals the transfer function can be mathematically expressed as a matrix, with different matrix elements of the matrix representing individual transfer functions applied to the corresponding different components of the multiplexed signal. As already indicated above, link conditions may change over time, thereby causing the transfer function to change as well, usually on a millisecond time scale or slower. In one embodiment, FFE circuit 110 and DSP 140 are configured to adaptively follow link-condition variations. For example, DSP 140 can employ blind adaptation algorithms to learn the link conditions and to cause the signal processing implemented in FFE circuit 110 and DSP 140 to adapt to the link conditions. Alternatively or in addition, from time to time, controller 150 might request that the remote transmitter send to receiver 100 a training or pilot sequence for DSP 140 to estimate the present transfer function. The signal processing implemented in DSP 140 might also compensate for certain nonlinear impediments, such as the phase shifts induced by self-modal and cross-modal fiber nonlinearity.

Figure 2A:
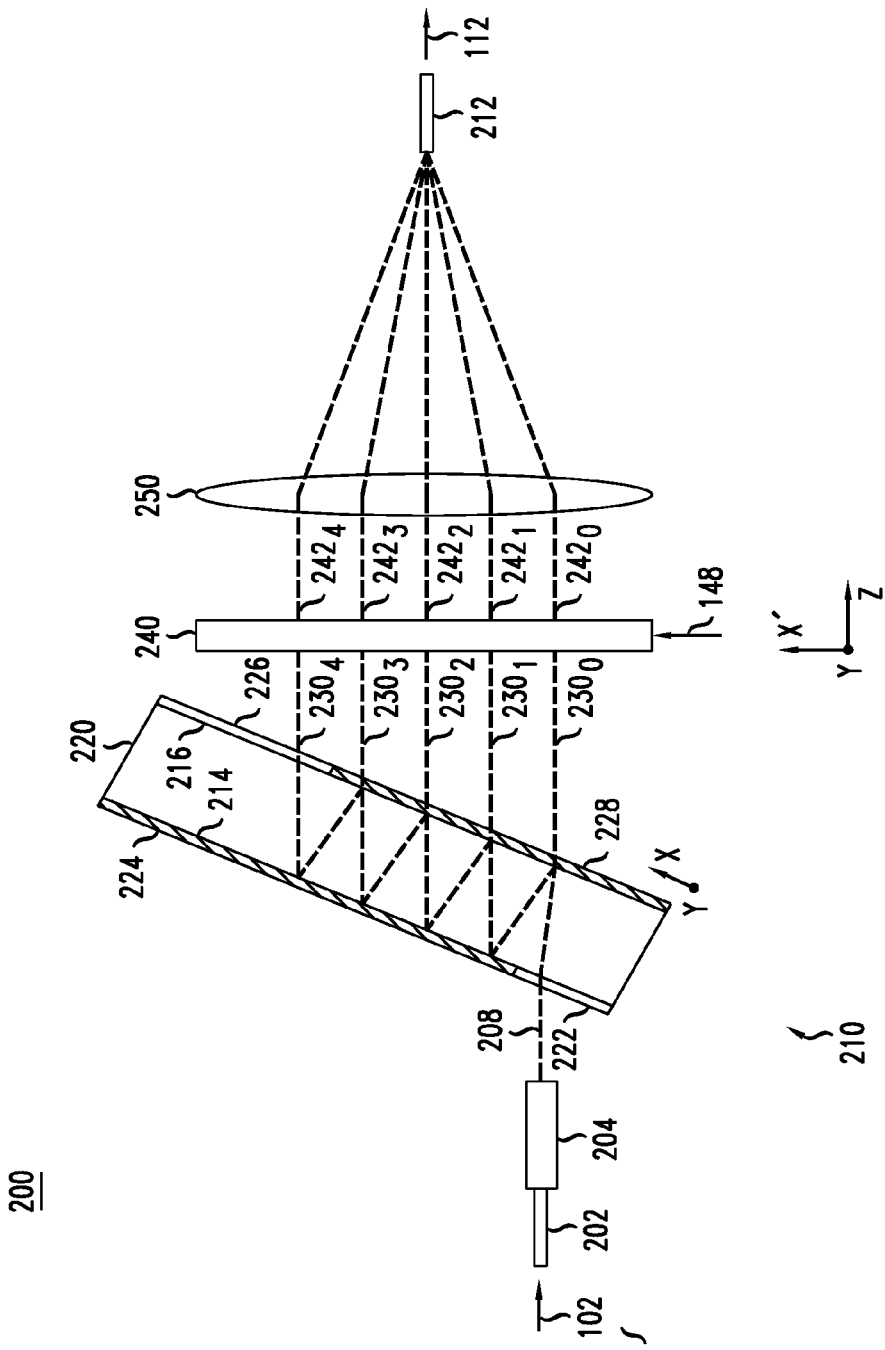
FIGS. 2A-2B illustrate a feed-forward equalizer (FFE) circuit that can be used in the optical receiver of FIG. 1 according to an embodiment of the disclosure.
Figure 2B:
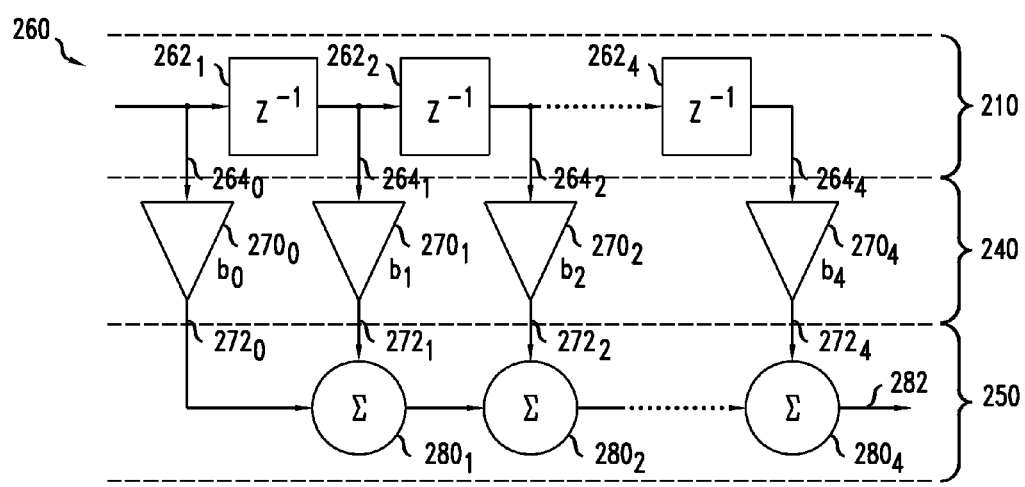

FIGS. 2A-2B illustrate an FFE circuit 200 that can be configured to operate as FFE circuit 110 (FIG. 1) according to an embodiment of the disclosure. More specifically, FIG. 2A shows a block diagram representing a side view of FFE circuit 200. FIG. 2B shows a flowchart 290 that represents the flow of the signal processing implemented in FFE circuit 200. Note that FFE circuit 200 can be considered to be an embodiment of FFE circuit 110 in which K=1 (also see FIG. 1).

Referring to FIG. 2A, FFE circuit 200 has an optical input fiber 202 and an optical output fiber 212. When FFE circuit 200 is used in an embodiment of receiver 100, optical input fiber 202 receives optical input signal 102, and optical output fiber 212 outputs optical signal 112, as indicated in FIG. 2A. In one embodiment, each of fibers 202 and 212 can be a single-mode fiber.

Optical input fiber 202 feeds light into a collimator 204 configured to transform that light into a collimated beam 208 and direct that beam to a beam splitter 210. In one embodiment, beam splitter 210 comprises a relatively thick optically transparent (e.g., glass) plate 220 whose two opposing surfaces 214 and 216 have four different coating films designated by numerical labels 222, 224, 226, and 228. More specifically, film 222, which covers a portion of surface 214, is an anti-reflection coating film that minimizes light reflections and causes substantially all light from beam 208 to couple into the interior of plate 220. Film 228, which covers a portion of surface 216, is configured to function as a partially transparent mirror that causes one portion of the light impinging on it from the interior of plate 220 to be transmitted to the exterior of the plate and another portion of the light to be reflected back into the interior of the plate, e.g., as indicated in FIG. 2A. Film 224, which covers a portion of surface 214, is configured to function as a fully reflecting mirror that causes substantially all light impinging on it from the interior of plate 220 to be reflected back into the interior of the plate, e.g., as indicated in FIG. 2A. Film 226, which covers a portion of surface 216, is an anti-reflection coating film that minimizes light reflections and causes substantially all light impinging on it from the interior of plate 220 to be transmitted to the exterior of the plate, e.g., as indicated in FIG. 2A.

The number of internal reflections in plate 220 depends on the tilt angle of optical input fiber 202 with respect to the surface of the plate and also on the relative size of the surface portions covered by films 226 and 228. In the configuration shown in FIG. 2A, these parameters are chosen to cause beam splitter 210 to split beam 208 into five sub-beams labeled $230_0$-$230_4$. One of ordinary skill in the art will appreciate that other coating-film configurations resulting in other respective total numbers of the sub-beams generated by beam splitter 210 are also possible.

In one embodiment, the reflectivity of film 228 may be non-uniform, e.g., gradually changing along the X direction. For example, the reflection profile of film 228 along the X direction may be such that the reflectivity of the film decreases toward the boundary with film 226 in a manner that causes sub-beams $230_0$-$230_4$ to have substantially equal intensities.

Sub-beams $230_0$-$230_4$ generated by beam splitter 210 impinge onto different respective areas of a spatial light modulator (SLM) 240. At an input plane 238 of SLM 240, sub-beams $230_1$-$230_4$ have a relative time delay with respect to sub-beam $230_0$ of $\tau$, $2\tau$, $3\tau$, and $4\tau$, respectively. One of ordinary skill in the art will understand that ti is a constant determined by the thickness of plate 220, the tilt angle(s) of the plate with respect to fiber 202 and SLM 240, and the refractive index of the plate's material.

SLM 240 is a configurable device that individually modulates each of sub-beams $230_0$-$230_4$, e.g., by applying to each of the sub-beams a respective spatial phase-modulation pattern or a respective spatial phase- and intensity-modulation pattern. For example, U.S. patent application Ser. No. 13/200,072 (filed Sep. 16, 2011) discloses suitable checkerboard phase modulation patterns, which can cause the corresponding optical beam to appear both phase- and amplitude-modulated when averaged, e.g., in the far field, over the pixels of the checkerboard. Such patterns can be used in SLM 240 for individually modulating each of sub-beams $230_0$-$230_4$. For additional details on these modulation patterns, the reader is referred to the above-mentioned U.S. patent application Ser. No. 13/200,072, which is incorporated herein by reference in its entirety.

When FFE circuit 200 is used in an embodiment of receiver 100, the pixel configurations of SLM 240 can be controlled by controller 150 via control signal 148, as indicated in FIG. 2A. In various embodiments, SLM 240 can be (i) a liquid-crystal-on-silicon (LCOS) SLM configured to operate in reflection or in transmission or (ii) a MEMS mirror array configured to operate in reflection. Appropriate polarization-control elements (e.g., one or more quarter-wave plates, not explicitly shown in FIG. 2A) can be used in FFE circuit 200, as known in the art, to ensure proper operation of SLM 240.

By applying a respective appropriate modulation pattern to each of sub-beams $230_0$-$230_4$, SLM 240 transforms these sub-beams into beams $242_0$-$242_4$, respectively, and directs the latter beams to a lens 250. Lens 250 is positioned so that the proximate terminus of optical output fiber 212 is located approximately at the focal point of the lens. As a result, lens 250 functions to spatially recombine beams $242_0$-$242_4$ and couple them into optical output fiber 212. The resulting coupled light forms optical signal 112.

In reference to both FIGS. 2A and 2B, the operation of FFE circuit 200 can be understood as follows. A delay line 260 in flowchart 290 (FIG. 2B) that comprises a series of delay elements $262_1$-$262_4$ schematically represents the optical-signal reflections within plate 220 (FIG. 2A). Each delay element 262 represents one of the back-and-forth trips in a zigzag pattern between surface 216 and surface 214 and can nominally be assigned a delay time of T. The signal that propagates through delay line 260 is tapped five times. Tap $264_0$ (FIG. 2B) represents the first partial reflection/transmission of signal 208 by film 228, which produces sub-beam $230_0$ (FIG. 2A). Tap $264_1$ (FIG. 2B) represents the second partial reflection/transmission of the optical signal after the first back-and-forth trip through plate 220 (FIG. 2A). The partial transmission through film 228 after the first back-and-forth trip produces sub-beam $230_1$ (FIG. 2A). Tap $264_2$ (FIG. 2B) represents the third partial reflection/transmission of the optical signal after the second back-and-forth trip through plate 220. The partial transmission through film 228 after the second back-and-forth trip produces sub-beam $230_2$ (FIG. 2A). Tap $264_3$ (FIG. 2B) represents the fourth partial reflection/transmission of the optical signal after the third back-and-forth trip through plate 220. The partial transmission through film 228 after the third back-and-forth trip produces sub-beam $230_3$ (FIG. 2A). Tap $264_4$ (FIG. 2B) represents the final transmission (without reflection) of the optical signal through film 226 after the final back-and-forth trip through plate 220 (FIG. 2A). This transmission produces sub-beam $230_4$ (FIG. 2B).

Multipliers $270_0$-$270_4$ in flowchart 290 represent different respective portions of SLM 240. Weighting coefficients $b_0$-$b_4$ applied by multipliers $270_0$-$270_4$ to taps $264_0$-$264_4$, respectively, represent the individual modulation patterns applied by the respective portions of SLM 240 to beams $230_0$-$230_4$. Weighting coefficients $b_0$-$b_4$ may have complex values. Weighted signals $272_0$-$272_4$ generated by multipliers $270_0$-$270_4$ represent beams $242_0$-$242_4$, respectively, generated by SLM 240.

A series of adders $280_1$-$280_4$ in flowchart 290 represent lens 250. As already explained above, lens 250 in FFE circuit 200 functions to combine beams $242_0$-$242_4$ into a single optical signal. Similarly, adders $280_1$-$280_4$ in flowchart 290 combine weighted signals $272_0$-$272_4$ to generate a single output signal 282. Output signal 282 in flowchart 290 represents optical output signal 112 in FFE circuit 200.

In an alternative embodiment, a single adder configured to appropriately combine weighted signals $272_0$-$272_4$ can be used instead of the series of adders comprising adders $280_1$-$280_4$ to functionally represent lens 250.

One of ordinary skill in the art will recognize that flowchart 290 corresponds to signal processing associated with a finite impulse response (FIR) filter. It therefore follows that FFE circuit 200 implements an optical variant of an FIR filter. One of ordinary skill in the art will further recognize that, when appropriately configured, an FIR filter, such as that implemented by FFE circuit 200, can be configured to mitigate the detrimental effects of various linear signal distortions, such as those caused by the effects of CD and PMD.

Figure 3C:
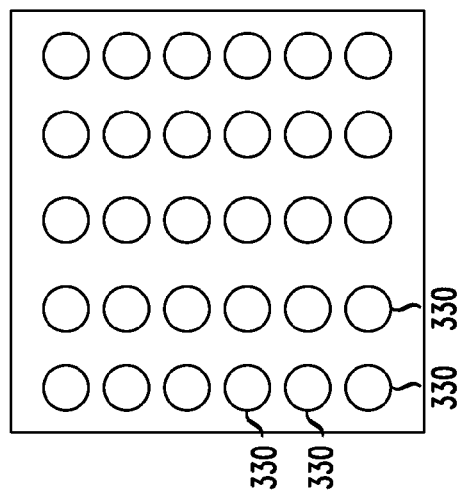
FIGS. 3A-3C illustrate possible modifications to the FFE circuit shown in FIG. 2A according to an embodiment of the disclosure.
Figure 3B:
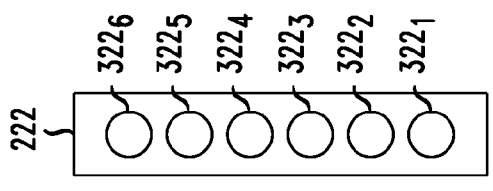
Figure 3A:
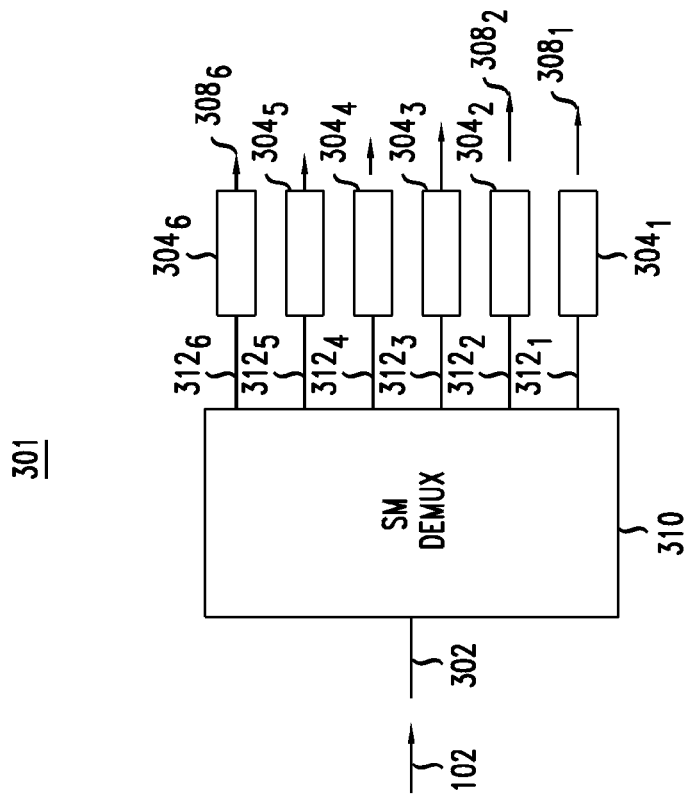

FIGS. 3A-3C illustrate possible modifications to FFE circuit 200 (FIG. 2A) according to an embodiment of the disclosure. These modifications enable the modified FFE circuit 200 to also mitigate the effects of spatial-mode mixing/crosstalk imposed onto optical input signal 102 by a multimode transmission fiber.

FIG. 3A shows a block diagram of an input module 301 that can be used to replace optical input fiber 202 and collimator 204 in FFE circuit 200. The proper orientation of input module 301 with respect to other elements of FFE circuit 200 is indicated by the coordinate-axis system X'YZ, which is shown in both FIGS. 2A and 3A.

Input module 301 includes a multimode fiber 302. When input module 301 is used in an embodiment of FFE circuit 200, multimode fiber 302 is configured to receive optical input signal 102.

Input module 301 further includes a spatial-mode (SM) de-multiplexer 310 that is coupled between multimode fiber 302 and six single-mode fibers $312_1$-$312_6$. SM de-multiplexer operates to separate the optical signals that populate different spatial modes of multimode fiber 302 and couple the separated optical signals into fibers $312_1$-$312_6$, respectively. Representative optical devices that can be configured to operate as SM de-multiplexer 310 in input module 301 are disclosed, e.g., in the above-cited U.S. patent application Ser. Nos. 13/200,072 and 12/986,468 and the above-cited U.S. Patent Application Publication Nos. 2010/0329670, 2010/0329671, and 2011/0243490.

Each of optical fibers $312_1$-$312_6$ feeds light into a corresponding one of collimators $304_1$-$304_6$. An individual collimator 304 is generally similar to collimator 204 (FIG. 2A) and operates to generate a corresponding collimated beam 308. Collimated beams $308_1$-$308_6$ generated by collimators $304_1$-$304_6$, respectively, are directed to beam splitter 210.

FIG. 3B shows light spots $322_1$-$322_6$ generated by collimated beams $308_1$-$308_6$, respectively, on the surface of film 222 in beam splitter 210. Upon receiving collimated beams $308_1$-$308_6$, beam splitter splits each of these beams, e.g., as described above in reference to FIG. 2A and beam 208. The result of this splitting is a 6×5 array of parallel optical sub-beams, each of which is similar to one of sub-beams $230_0$-$230_4$ shown in FIG. 2A.

FIG. 3C shows thirty light spots 330 generated at input plane 238 of SLM 240 by the 6×5 rectangular array of the optical sub-beams generated by beam splitter 210 from collimated beams $308_1$-$308_6$. Each of the thirty sub-beams is individually modulated by SLM 240, which transforms each sub-beam into a beam that is analogous to one of beams $242_0$-$242_4$. Lens 250 then spatially recombines these spatially modulated beams and couples them into optical output fiber 212. The resulting coupled light forms optical signal 112, as already indicated in FIG. 2A.

In various alternative embodiments, the FFE circuit illustrated by FIGS. 3A-3C can similarly be designed to generate a differently sized array of sub-beams analogous to sub-beams $230_0$-$230_4$. For example, the FFE circuit can employ, in place of SM de-multiplexer 310, an SM de-multiplexer designed to be coupled to a different (#6) number of optical fibers 312. Alternatively or in addition, beam splitter 210 can be configured to generate a different (#5) number of sub-beams from each received beam, e.g., by changing the thickness of plate 220, the geometry of the film coatings, and the tilt angles.

Figure 4:
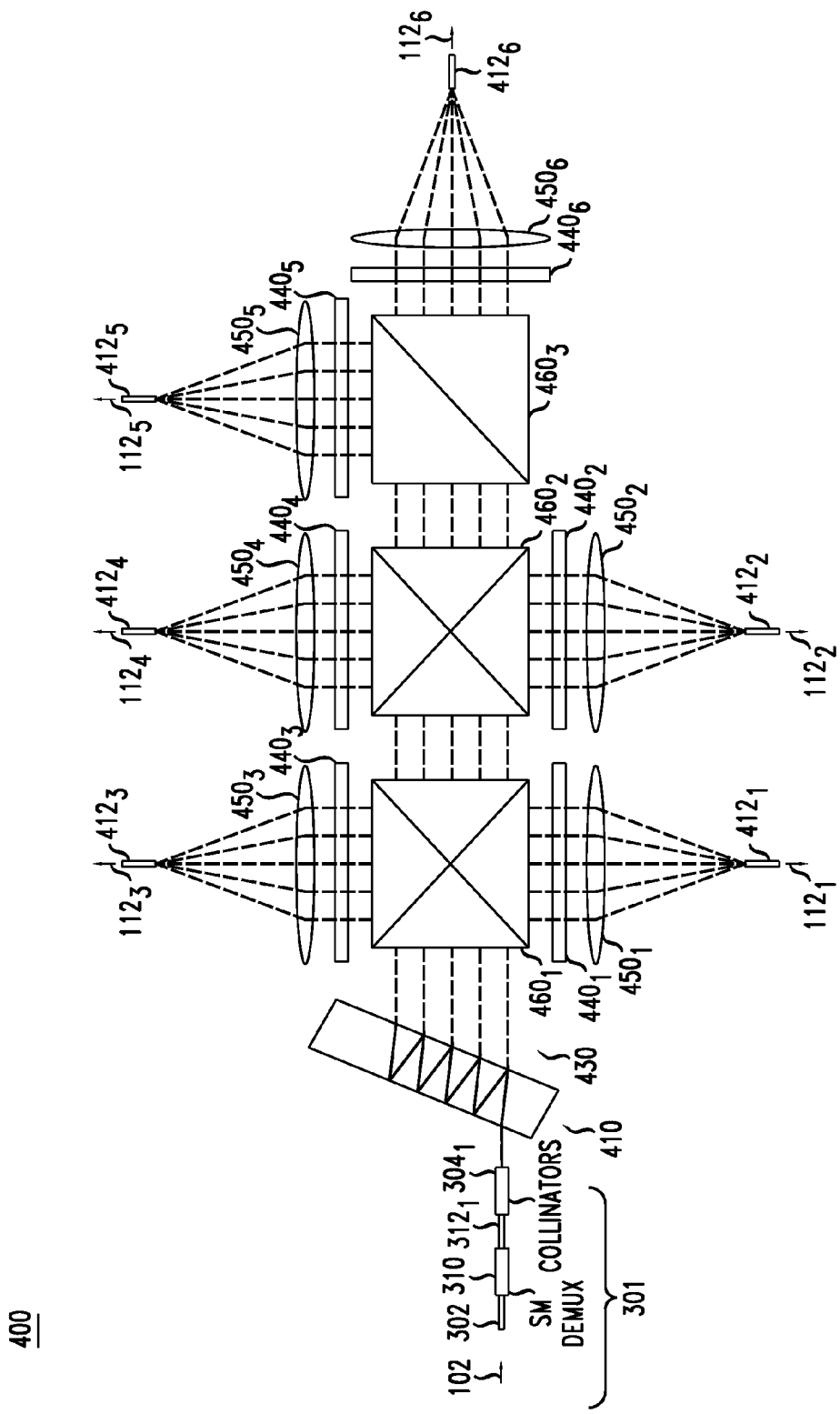
FIG. 4 shows a block diagram representing a side view of an FFE circuit that can be used in the optical receiver of FIG. 1 according to an embodiment of the disclosure.

FIG. 4 shows a block diagram representing a side view of an FFE circuit 400 that can be used as FFE circuit 110 (FIG. 1) according to another embodiment of the disclosure. Note that FFE circuit 400 corresponds to K=6.

FFE circuit 400 includes input module 301 (also see FIG. 3A). The projection shown in FIG. 4 corresponds to a view along the Y-coordinate axis in FIG. 3A. Due to this projection being shown in FIG. 4, only optical fiber $312_1$ is visible, with the view of optical fibers $312_2$-$312_6$ being blocked in FIG. 4 by optical fiber $312_1$, and only collimator $304_1$ is visible, with the view of collimators $304_2$-$304_6$ being blocked in FIG. 4 by collimator $304_1$.

FFE circuit 400 further includes six output fibers $412_1$-$412_6$. When FFE circuit 400 is used in an embodiment of receiver 100, optical input fiber 302 of input module 301 receives optical input signal 102, and optical output fibers $412_1$-$412_6$ yield optical signals $112_1$-$112_6$, respectively, as indicated in FIG. 4.

The collimated beams generated by collimators $304_1$-$304_6$ in FFE circuit 400 are directed to a beam splitter 410, which is configured to split each of the received beams into five corresponding sub-beams 430. In one embodiment, beam splitter 410 is generally analogous to beam splitter 210 (FIG. 2A).

In addition to beam splitter 410, FFE circuit 400 includes beam splitters $460_1$-$460_3$ configured to operate as indicated in FIG. 4. More specifically, beam splitters $460_1$-$460_3$ operate to further split each of sub-beams 430 generated by beam splitter 410 and distribute the resulting sub-beams among SLMs $440_1$-$440_6$, as indicated in FIG. 4. In one embodiment, each of beam splitters $460_1$-$460_2$ is a cube having two internal planar interfaces arranged diagonally in an X shape. Beam splitter $460_3$ can be a conventional 3-dB beam-splitting cube.

Each of SLMs $440_1$-$440_6$ used in FFE circuit 400 is generally analogous to SLM 240 (FIG. 2A). As such, each of SLMs $440_1$-$440_6$ is configurable to display spatial modulation patterns that act to mitigate the detrimental effects of various above-indicated linear signal distortions.

Each of lenses $450_1$-$450_6$ used in FFE circuit 400 is generally analogous to lens 250 (FIG. 2A). As such, each lens 450 functions to spatially recombine the optical beams received from the corresponding one of SLMs $440_1$-$440_6$ and couple them into the corresponding one of optical output fibers $412_1$-$412_6$. The resulting coupled light forms a respective one of optical output signals $112_1$-$112_6$.

One of ordinary skill in the art will appreciate that the design concept illustrated by FIG. 4 can be used to design an alternative embodiment of FFE circuit 400, in which (i) input module 301 is replaced by a similar input module, but having any desired number N of fibers 312 and collimators 304 and (ii) the number of beam splitters 460, SLMs 440, and lenses 450 is appropriately changed to enable the FFE circuit to have any desired number K of output fibers 412.

Figure 5:
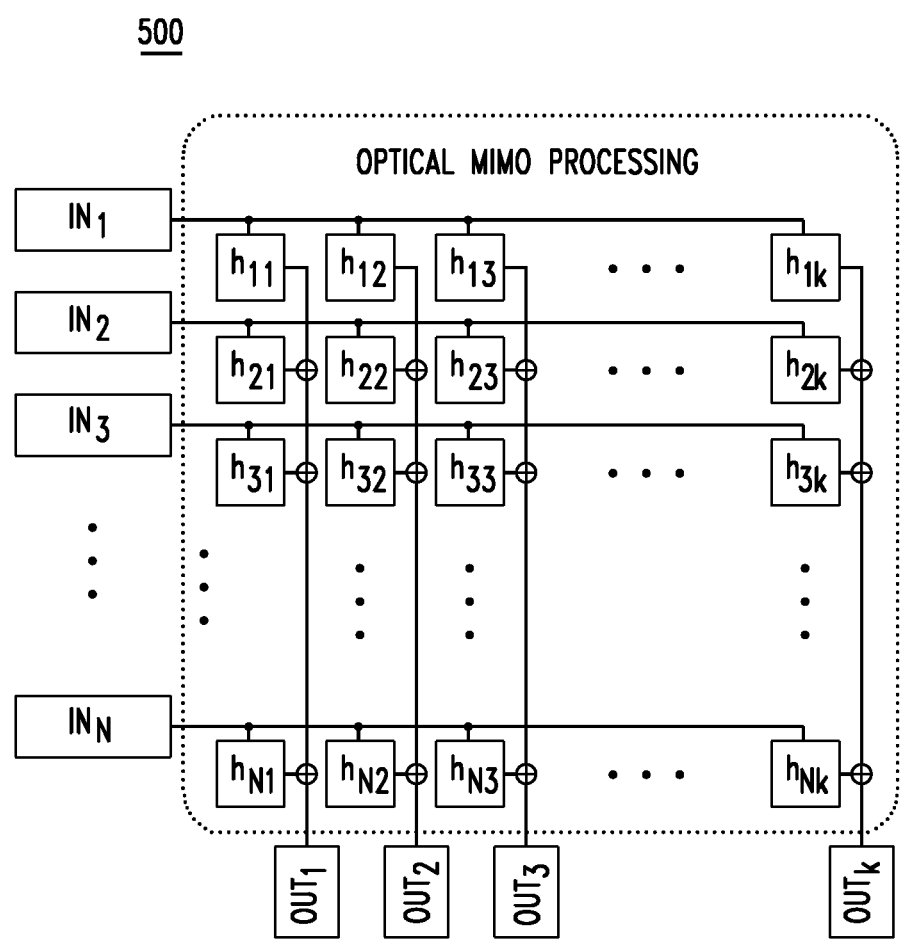
FIG. 5 illustrates a method of MIMO signal processing that can be implemented in an FFE circuit according to yet another embodiment of the disclosure.

FIG. 5 illustrates a method 500 of MIMO signal processing that can be implemented in an embodiment of FFE circuit 400 having N fibers 312/collimators 304 in input module 301 and K output fibers 412 (also see FIG. 4).

Each of input blocks $IN_1$-$IN_N$ in FIG. 5 represents an optical beam generated by a corresponding one of the N collimators analogous to collimators 304 in FIG. 4. Each of output blocks $OUT_1$-$OUT_K$ in FIG. 5 represents a corresponding one of the K output signals coupled into the output fibers analogous to output fibers 412 in FIG. 4. Each of the processing blocks labeled $h_{nk}$ (where n=1, 2, ..., N and k=1, 2, ..., K) represents a corresponding matrix element of the inverse transfer function corresponding to the optical transport link between the remote transmitter and receiver 100. The value of each matrix element $h_{nk}$ is set by the configuration of the respective surface portion of the respective one of SLMs 440 (also see FIG. 4). For example, the value of each of matrix elements $h_{n1}$ (where n=1, 2, ..., N) is set by the configuration of the respective portion of SLM $440_1$. The value of each of matrix elements $h_{n2}$ (where n=1, 2, ..., N) is set by the configuration of the respective portion of SLM $440_2$. The value of each of matrix elements $h_{n3}$ (where n=1, 2, ..., N) is set by the configuration of the respective portion of SLM $440_3$, and so on. As already indicated above, by using appropriate $h_{nk}$ values, the signal processing of method 500 can substantially undo the effects of spatial-mode mixing/crosstalk in a multimode fiber, thereby causing the optical signals received at each of output blocks $OUT_1$-$OUT_K$ to represent a corresponding one of the optical signals originally coupled into the corresponding spatial mode of the multimode fiber at the transmitter end of the optical transport link. Further adjustment of the $h_{nk}$ values can be used to reduce the detrimental effects of CD and/or PMD caused by the optical transport link.

Certain embodiments of the apparatus and methods disclosed herein may benefit from the various aspects of the apparatus and methods disclosed in provisional U.S. patent application Ser. No. 61/608,139 (filed on Mar. 8, 2012) by Roland Ryf, Rene-Jean Essiambre, and Nicolas K. Fontaine, entitled "Multimode Optical Communication Apparatus and Methods." This provisional patent application is incorporated herein by reference in its entirety.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, microsystems, and devices produced using microsystems technology or microsystems integration.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those of ordinary skill in the art that any block diagrams herein represent conceptual views of illustrative circuitry embodying the principles of the invention.

What is claimed is:

1. An apparatus comprising an optical feed-forward equalizer configured to be coupled between an input fiber and a plurality of output fibers, wherein said feed-forward equalizer comprises:
   an optical splitter configured to optically split light received from the input fiber into a plurality of sub-beams; and
   a plurality of spatial light modulators (SLMs), wherein:
   the optical splitter is further configured to apply a respective subset of said plurality of sub-beams to each of the plurality of SLMs such that different sub-beams of the respective subset impinge on different respective portions of a respective SLM;
   each of the plurality of SLMs is configured to (i) receive said respective subset of said plurality of sub-beams from the optical splitter with relative time delays with respect to one another and (ii) spatially modulate each of the received sub-beams to generate a respective modulated beam; and
   the feed-forward equalizer is configured to couple the modulated beams generated by each of the plurality of SLMs into a respective output fiber of the plurality of output fibers.

2. The apparatus of claim 1, wherein the relative time delays have values from a set consisting of integer multiples of a constant time delay.

3. The apparatus of claim 1, wherein the feed-forward equalizer is configured to operate as an optical finite-impulse-response filter.

4. The apparatus of claim 1, wherein the input fiber is a multimode fiber.

5. The apparatus of claim 4, wherein:
   the feed-forward equalizer further comprises an optical spatial-mode de-multiplexer coupled to multimode fiber and configured to spatially separate light that populates different spatial modes of the multimode fiber; and
   the optical splitter is configured to optically split each respective portion of the spatially separated light corresponding to a respective one of the different spatial modes to generate respective subset of the plurality of sub-beams.

6. The apparatus of claim 1, wherein at least one of the plurality of SLMs is configured to operate in transmission.

7. The apparatus of claim 1, wherein at least one of the plurality of SLMs comprises an array of MEMS mirrors.

8. The apparatus of claim 1, wherein the optical splitter comprises an optically transparent plate having first and second opposing surfaces, wherein:
   the first surface has a first portion covered by an anti-reflection coating and a second portion covered by a non-transparent mirror; and
   the second surface has a first portion covered by a partially transparent mirror.

9. The apparatus of claim 8, wherein:
   the first portion of the first surface is configured to receive light from the input fiber and couple the received light into an interior of the optically transparent plate; and
   the optical splitter is configured to generate at least a subset of the plurality of sub-beams using light that exits the interior of the optically transparent plate through the partially transparent mirror.

10. The apparatus of claim 8, wherein:
    the second surface has a second portion covered by an anti-reflection coating; and
    the optical splitter is configured to generate at least one of the sub-beams using light that exits the interior of the optically transparent plate through the second portion of the second surface.

11. The apparatus of claim 8, wherein the partially transparent mirror has non\-uniform reflectivity across the first portion of the second surface.

12. The apparatus of claim 1, further comprising a controller coupled to the plurality of SLMs to control respective spatial modulation patterns imparted by the SLMs onto the respective received sub-beams.

13. The apparatus of claim 12, wherein the controller is configured to cause the SLMs to display the respective spatial modulation patterns in a manner that causes the feed-forward equalizer to invert a transfer function corresponding to spatial-mode mixing imparted, by a corresponding optical transport link, on the light received from the input fiber.

14. The apparatus of claim 1, further comprising a controller coupled to the plurality of SLMs to control spatial modulation patterns imparted by the SLMs onto the received sub-beams, wherein the controller is configured to cause the SLMs to display the spatial modulation patterns in a manner that causes the feed-forward equalizer to mitigate effects of dispersion imparted, by an optical transport link, on the light received from the input fiber.

15. The apparatus of claim 1, wherein:
the feed-forward equalizer is part of an optical receiver; and
the optical receiver comprises a coherent optical detector configured to receive light from the feed-forward equalizer through an optical fiber configured to receive a subset of the modulated beams generated by the plurality of SLMs.

16. The apparatus of claim 1, wherein:
the plurality of SLM includes a first SLM and a second SLM;
the first SLM has a first planar surface configured to receive a first subset of said plurality of sub-beams from the optical splitter;
the second SLM has a second planar surface configured to receive a second subset of said plurality of sub-beams from the optical splitter, the second subset being different from the first subset; and
the first planar surface and the second planar surface are not coplanar.

17. The apparatus of claim 16, wherein the first planar surface and the second planar surface are orthogonal to one another.

18. The apparatus of claim 16, wherein the first planar surface and the second planar surface are parallel to one another.

* * * * *